United States Patent [19]

Rubin

[11] 3,887,279

[45] June 3, 1975

[54] TRICOLOR ADDITIVE SYSTEM FOR A COLOR HEAD

[76] Inventor: Randolph D. Rubin, 301 W. Ohio, Midland, Tex. 79701

[22] Filed: Jan. 2, 1974

[21] Appl. No.: 429,574

[52] U.S. Cl. .................. 355/38; 355/70; 355/88; 346/175
[51] Int. Cl. .......................................... G03b 27/76
[58] Field of Search ............ 355/35, 37, 38, 70, 88; 356/175–178

[56] References Cited
UNITED STATES PATENTS

| | | | |
|---|---|---|---|
| 3,120,782 | 2/1964 | Goddard et al. | 355/37 |
| 3,227,040 | 1/1966 | Dauser | 355/38 |
| 3,672,768 | 6/1972 | Schaub et al. | 355/38 |

Primary Examiner—Richard A. Wintercorn
Attorney, Agent, or Firm—Marcus L. Bates

[57] ABSTRACT

A color head control system for reproducibly making optimum color prints. A lamphouse is optically coupled with an enlarger to supply a source of light comprised of several primary colors. A sample of the light provides a first signal representative of the intensity of one of the primary colors.

A second signal representative of the desired intensity of the primary color of the delivered light source is connected to an electronic error detector. The ratio between the first and second signals is automatically maintained at a constant predetermined value by the error detector, thereby providing exposure light comprised of optimum relative color value and intensity.

18 Claims, 10 Drawing Figures

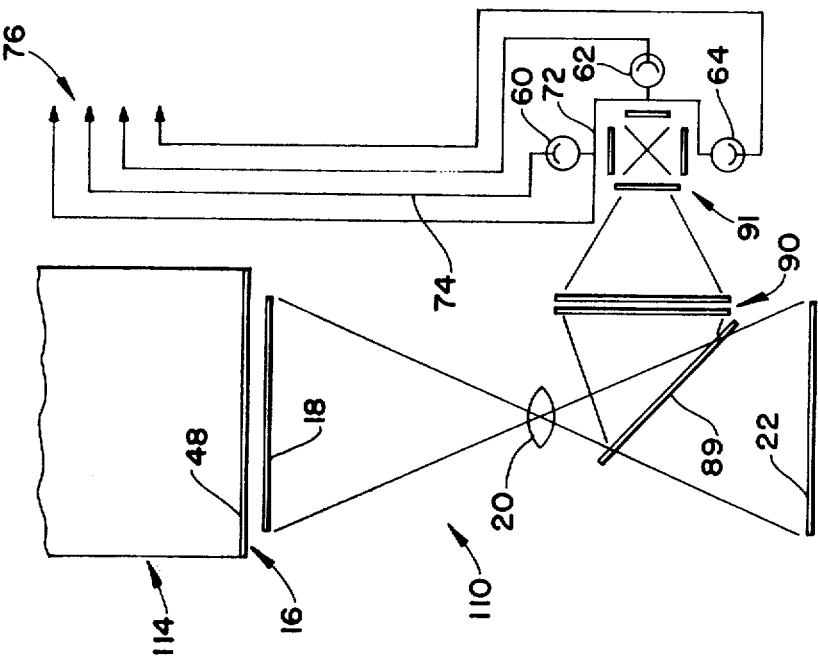
FIG. 3
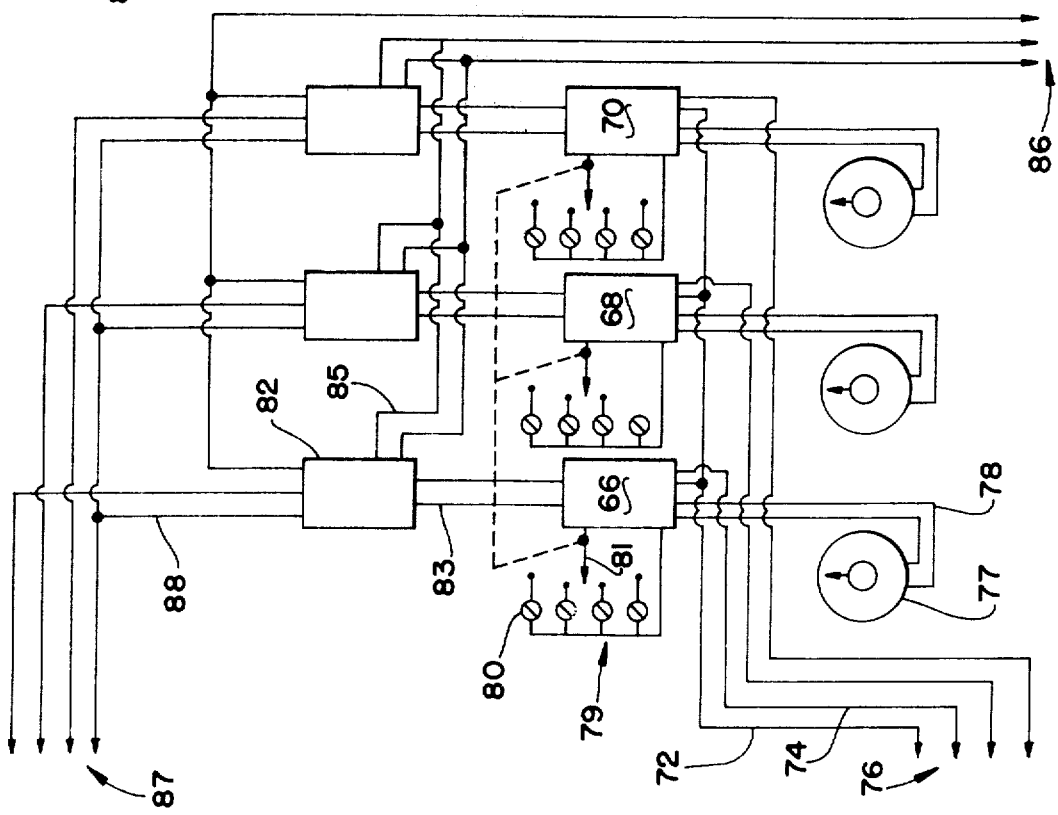
FIG. 4
FIG. 2

PATENTED JUN 3 1975 3,887,279

SHEET 3

ONE CHANNEL (OF THREE)

TRICOLOR ADDITIVE SYSTEM FOR A COLOR HEAD

BACKGROUND OF THE INVENTION

Tricolor additive systems for exposing color sensitive material are known. Broadly, the prior art systems comprise a color head which is substituted for the usual light bulb or light source in a photographic enlarger to supply red, green and blue light in various relative intensities or color value in order to balance the characteristics of a given color negative respective to the color paper, so that the resultant print is a compromise which is pleasing to the eye, or at least acceptable to the viewer.

The color heads presently available may be classified as the "tricolor additive" and the "substractive" systems. In the former, red, green, and blue light is mixed to provide a composite light for exposure of color sensitive paper. The latter system consists of cyan, magenta, and yellow filters being inserted into the light path to accomplish variation in the relative color value of the exposing light, as will be more fully appreciated from the following references.

DESCRIPTION OF THE PRIOR ART

The broad concept of controlling various parameters of the variables employed in color photograph enlarging is taught in the following patents, to which reference is made for further background of the present invention U.S. Pat. Nos.:

3,588,246; 3,100,815; 3,097,563; 3,120,782;
3,653,759; 3,359,424; 3,227,040; 3,504,971;
3,647,296; Russian Pat. No. 147,913 issued 1961;

and to the references of record cited in the above patents.

SUMMARY OF THE INVENTION

This invention comprehends a tricolor additive system for a color head, which comprises coupling a lamphouse with an enlarger to provide a single source of aggreate light comprised of a plurality of primary colors.

The color intensity of each of the primary colors is controlled by an electrical signal which can be changed in magnitude to provide a vast range of possible relative color values.

A sample of the composite or aggreate light is transmitted through a filter means which separates the light into each of its color components.

The intensity of each of the separated primary colors is measured and a proportional electrical signal generated. The relative signal values therefore represent the relative color values of the light which is used to expose the photo material.

The first and second signals are maintained at a constant predetermined ratio by an error detector so that the intensity of the different primary colors and their relative color values are maintained at a predetermined magnitude.

Therefore, a primary object of the present invention is to provide a tricolor additive system for exposing color sensitive material in a new and unobvious manner.

Another object of the invention is to provide a color head having control means which enables light of any relative color value and intensity to be selected, and thereafter will maintain the same relative color value and intensity.

A further object of this invention is to disclose and provide improvements in a control system for repeatedly making optimum color prints.

A still further object of this invention is to provide a new combination of elements in the form of a control system for reproducibly making optimum color prints.

Another and still further object is to provide a new method of making enlarged color prints from a color negative by employment of a light responsive closed loop electronic feedback control circuit wherein the desired light characteristics are selected and thereafter the light is continuously monitored and adjusted to automatically compensate for any changes which would otherwise inherently occur thereto.

An additional object of the instant invention is to provide a control system for use in color photography wherein a light source comprised of various primary colors are each maintained at a predetermined magnitude and relative color value.

Another object of this invention is the provision of method and apparatus for achieving automatic color balance and exposure density control in photo printing by the use of large area transmission density techniques, also called intergration method or techniques.

Another object of the invention is the provision of technical means and methods of advantageously making color prints or the like while avoiding the usual problems associated with reciprocity failure and slope failure.

An additional object of the invention is the provision of method and apparatus for automatically controlling the intensity and purity of a composite light source for printing black and white prints on variable contrast photo sensitive material.

These and various other objects and advantages of the invention will become readily apparent to those skilled in the art upon reading the following detailed description and claims and by referring to the accompanying drawings.

The above objects are attained in accordance with the present invention by the provision of a combination of elements which are fabricated in a manner substantially as described in the above abstract and summary.

BRIEF DESCRIPTION OF THE DRAWINGS

FIG. 2 is a part diagrammatical, part schematical representation of circuitry and other apparatus for use in conjunction with the inventative apparatus of FIG. 1;

FIG. 3 is a diagrammatical representation of a power source and focus-print switch for use in conjunction with the apparatus illustrated in FIGS. 1 and 2;

FIG. 4 is a fragmentary, part schematical, part diagrammatical, representation of a second embodiment of the present invention;

DETAILED DESCRIPTION OF THE PREFERRED EMBODIMENTS

Figure 1:
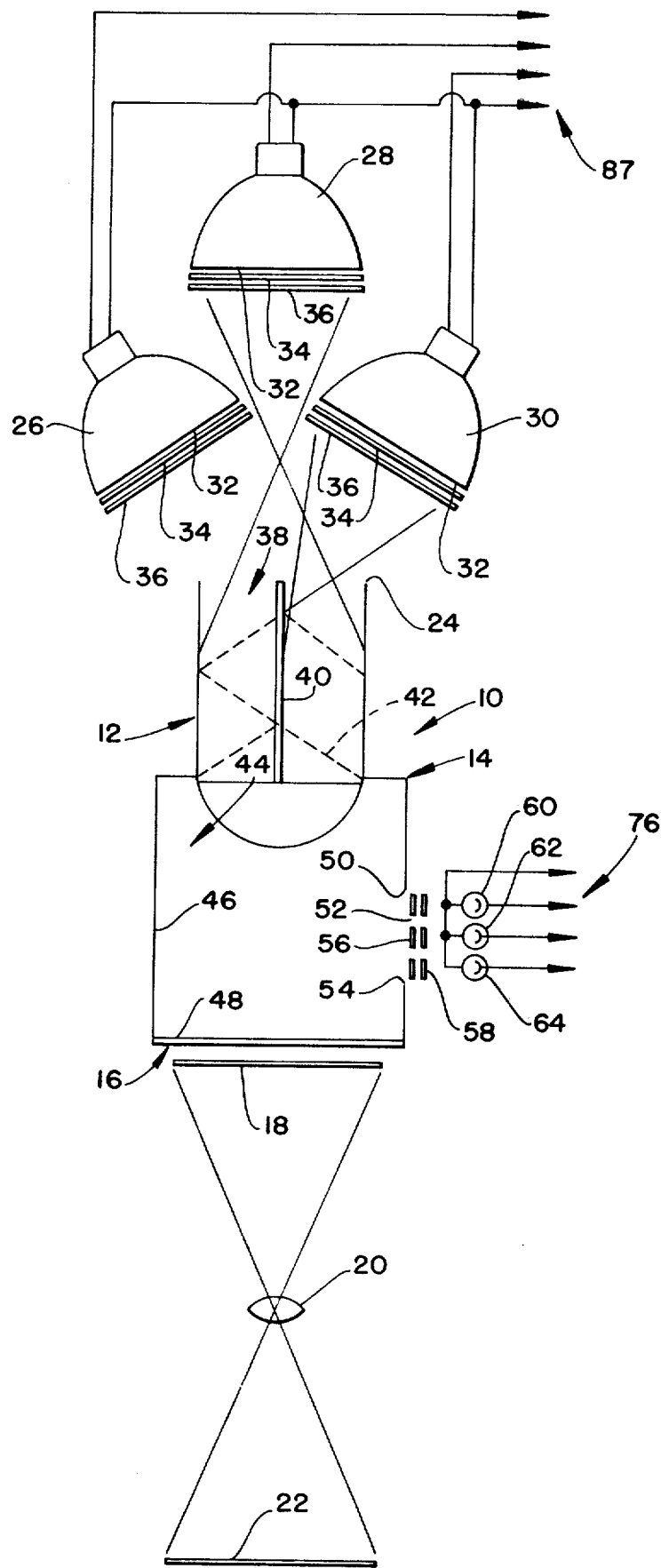
FIG. 1 is a part diagrammatical, part schematical representation of apparatus made in accordance with the present invention.

In the embodiment of FIG. 1 there is disclosed a photographic printer apparatus 10 for color printing comprising a mixing chamber illustrated in the form of a box 12 which downwardly opens into a lamphouse box 14 for providing a source of aggreate light of red, green, and blue components, or other primary color combinations, as will be more fully explained later on in this disclosure. Spaced from the light outlet 16 of the lamp box is a negative 18. The negative is interposed between lens 20 and the light source 16 so that an image on the negative can be focused at easel 22. The upper extremity of the diffusing box has an opening 24 so that light from the spaced lamps 26, 28, and 30 can be directed thereinto.

The light from each of the lamps at 32 must travel through a heat rejecting filter 34 and a broad band filter 36 with the filters being selected so that predominately red light passes from lamp 26 into opening 24 of the mixing chamber as indicated by the arrow at numeral 38. In a similar manner, predominately green light travels from lamp 28 into the mixing chamber, and blue light from lamp 30. The mixing chamber is provided with a transparent mirror 40, or the like, having 50 percent transmission and 50 percent reflection, so that multiple reflections occur as indicated at 42 as the filtered light from the three lamps ultimately flows from the mixing chamber into the lamp house as indicated by the arrow at numeral 44. The interior 46 of the lamp house is provided with a reflective coating in the usual manner so that light passing through diffusor 48 is comprised of a plurality of light components of different wave lengths representative of the red, green, and blue spectrum.

Ports 50, 52, and 54 are formed by suitably aperturing a wall portion of the mixing chamber. The ports are spaced from one another and positioned so that a representative sample of light passes therethrough. Each port is provided with an infrared cutoff filter 56 and a narrow band color filter 58 so that only red light passes from the lamp house to the photocell 60, only green light passes from the lamp house to photocell 62, while only blue light passes from the lamp house to photocell 64. Accordingly, photocell 60 "sees" a pure sample of red light, photocell 62 sees a pure sample of green light, while photocell 64 sees a pure sample of blue light.

The size and configuration of the apertures 50 – 54 may be arranged to meter the quantity of light received by any individual photocell. The apertures may be spaced vertically as illustrated, or radially spaced apart as taught hereinafter in the disclosure.

In FIG. 2, the numerals 66, 68 and 70 each represent circuitry for the provision of an error detector and reference voltage supply, the details of which will be more fully disclosed later on. Each of the detectors are connected to receive an electrical signal from their respective photocells by means of the electrical conduits 72 and 74, for example. A disconnect is provided at 76, FIGS. 1 and 2. Each of the detectors are connected to a control apparatus as seen at 77 by means of electrical conduit 78 so that the reference voltage at 66, for example, can be selected by manipulation of the control.

Alternatively, preset controls 79, comprised of a plurality of individual preset resistors 80, can be used by moving selector gang switch 81 into electrical contact therewith.

A solid state power control 82 receives a source of power for the lamps from a voltage power source 84, shown in FIG. 3, by means of electrical conduits 85. The power supply can be disconnected from the remainder of the circuitry by means of a disconnect broadly suggested in FIGS. 2 and 3 by the arrow at numeral 86. Electrical conduits 85 connect the power control apparatus to the voltage supply. Disconnect 87 interconnects the lamps of FIG. 1 with the power control of FIG. 2 by means of electrical conduits 88.

Throughout this disclosure, wherever it is possible, or logical to do so, like numerals refer to like or similar elements. In the embodiment of FIG. 4, a source of light predominately restricted to the red, green, and blue spectrum is directed through negative 18, lens 20, and onto the easel or exposure plane 22. Beam splitter 89 is positioned between the lens and the easel so that a representative sample of light is directed through the Fresnel lens at 90. Light from the Fresnel lens passes into an arrangement of dichroic mirrors to thereby split the light into proportional amounts so that a representative sample of the light beam is received by each of the photocells 60, 62, and 64.

The effective distance measured between the lens 20 and the photocells 60–64 is maintained equal to the effective distance measured between lens 20 and the exposure plane 22 to thereby provide size compensation as related to exposure by the large area transmission density or integration method.

Accordingly, the second embodiment of the present invention represents a color balance and exposure apparatus which utilizes the intergration method since the characteristics of the light is considered after it has passed through the negative 18. The apparatus 110 comprises lamps and filters which have been arranged in accordance with the teachings of either embodiment of the present invention. Disconnect 76 is utilized to connect the apparatus of FIG. 4 into the circuitry of FIGS. 2 and 3.

Figure 5:
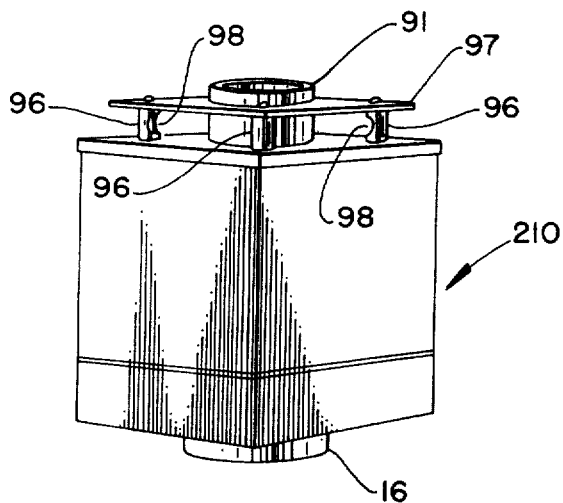
FIG. 5 is a perspective view of one form of apparatus made in accordance with the present invention.
Figure 7:
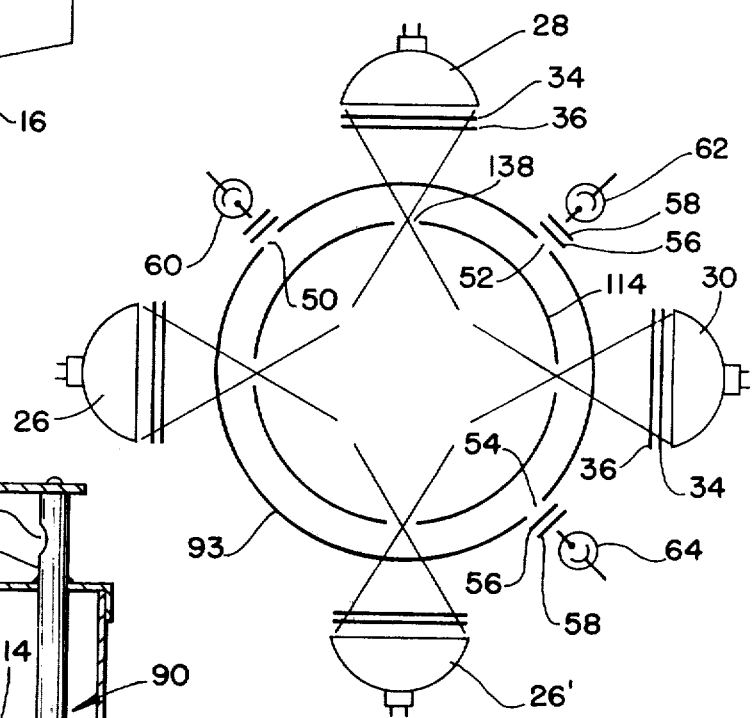
FIG. 7 is a top plan view which schematically illustrates apparatus made in accordance with the embodiment of the invention disclosed in FIG. 5.
Figure 6:
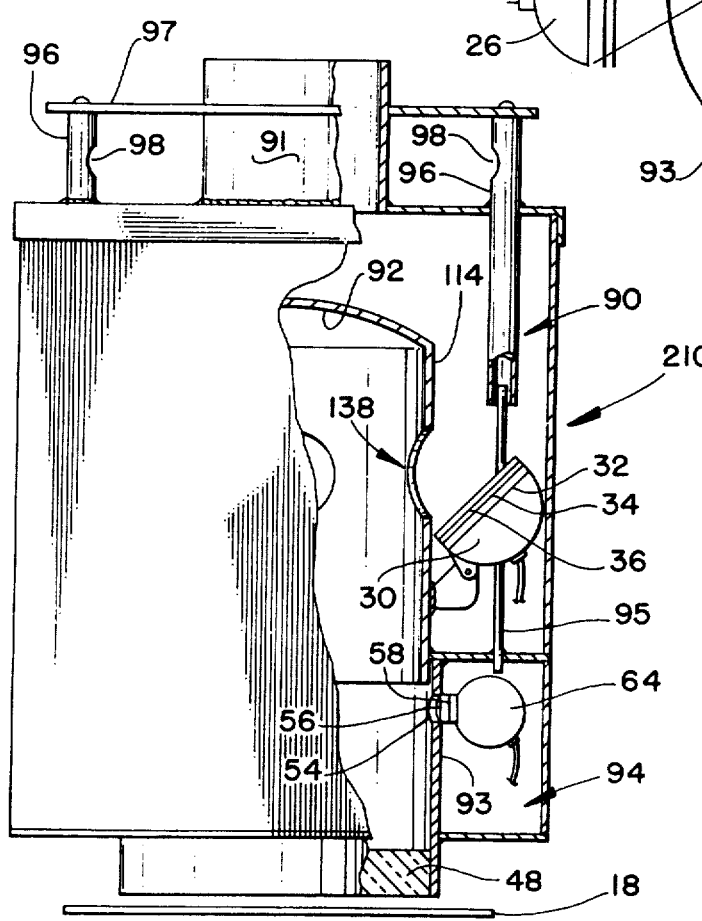
FIG. 6 is an enlarged, part cross-sectional representation of the embodiment of the invention disclosed in FIG. 5.

Looking now to the more specific embodiment of the invention illustrated in FIGS. 5, 6, and 7, it will be noted that lamps 26, 28, and 30 are radially spaced about a lamp house having a parabolic roof 92 and a side wall 93. The lamps are each provided with the necessary filters so that a separate source of red, green, and blue light, respectively, is available and passes through the individual light inlets 138, respectively, where the light is then diffused by multiple reflection before it is permitted to pass through the diffuser 48.

Ports 50–54 are formed within side wall 93 of the lamp house 114 in underlying relationship respective to ports 138, with the ports being spaced apart from one another and from the lamps. Filters 56 and 58 are provided within the ports, as in the before described manner, with photocells 60–64 being arranged to receive a representative sample of the light from the interior of the lamp house.

Each of the photocells are located within a chamber 94, and electrically connected to an error detector, a control, a power supply, and to its corresponding lamp as in the before described manner of FIGS. 1–3.

In the operation of the first embodiment, the error detector receives a constant voltage from the power supply and delivers voltage to the power control in accordance with the intensity selector 77 shown in FIG. 2. Once the intensity selector is positioned to provide a signal to the power controller, the attendant lamp connected thereto will change in intensity until the signal received from the attendant photocell or detector represents to the error detector that the selected intensity has been satisfied. For example, assuming the intensity selector 77 has been set so that a given value of red light passes through diffuser 48, the error detector will thereafter cause the power controller to maintain whatever changes are required in the power delivered to the lamp 26 so that this condition remains satisfied. This desirable expedient is brought about my impinging a sample of the red light from within the lamp house onto the photocell 60, which produces a signal at 74 representative of the intensity of the red light. This last recited signal is received by the error detector 66 and compared to the signal from the intensity selector 77, so that the error detector can subsequently provide a signal at 83 causing power controller 82 to either increase or decrease the power delivered to lamp 26 in order to increase or decrease the available light as required. Accordingly, the present invention provides a closed loop feed-back system wherein a power controller delivers light to a lamp house which is optically coupled with an enlarger or printer to provide a single source of light of red color which is continuously sampled at 50 and compared to a desired set intensity level at 77, and any error between the desired signal at 78 and the actual signal at 74 is detected at 66 so that 82 can be changed to cause the desired error signal to assume its proper proportionate values. The remaining systems, 68 and 70, for green and blue light, respectively, are identical in operation.

By the utilization of the three individual controls together with the feed-back principle, exact exposure control of each of the three colors to each of the sensitive layers on the print paper is achieved because of the electronic feed-back system which sees the light source, compares the intensity of each of the individual colors with a predetermined selected color value and continually adjusts the intensity of the produced light so that it agrees with the predetermined selected or set value.

Accordingly, any undesirable change in any one of the three color values which provides the source of aggreate light is immediately corrected thereby causing the relative intensity and relative color value of the source to remain at some optimum preselected value.

Looking again now to the illustration set forth in FIGS. 5–7, the apparatus 210 is seen to be housed within an enclosure within which an upper chamber 90 is separated from a lower annular chamber 94. Coolant air outlet 91 is axially aligned along the vertical axis of the cylindrical lamphouse box 114, with the parabolic roof 92 being spaced therefrom.

Reduced diameter hollow tube 95 flow connects inlet tube 96 with the before mentioned annular chamber 94, with an upper marginal end portion of the reduced diameter tubing being received within the enlarged hollow tubing 96, thereby forming an eductor apparatus. Inlet 98 is formed in a side wall of the large tubing so that ambient air can enter the system.

Each tube 96 is affixed to the illustrated closure member and to a support plate 97 so that the outlet 91, inlet tubes 96, and plate 97 are rigidly affixed to one another and may be removed as an integral unit from the remainder of the apparatus.

In FIG. 7, it will be noted that two light sources 26, 26' have been provided for supplying red light for the reason that it is often desirable to have an excess of red light as compared to green and blue. It is sometimes desirable to use color sensitive material which requires large amounts of green or blue light, rather than red, as in the foregoing example.

Figure 8A:
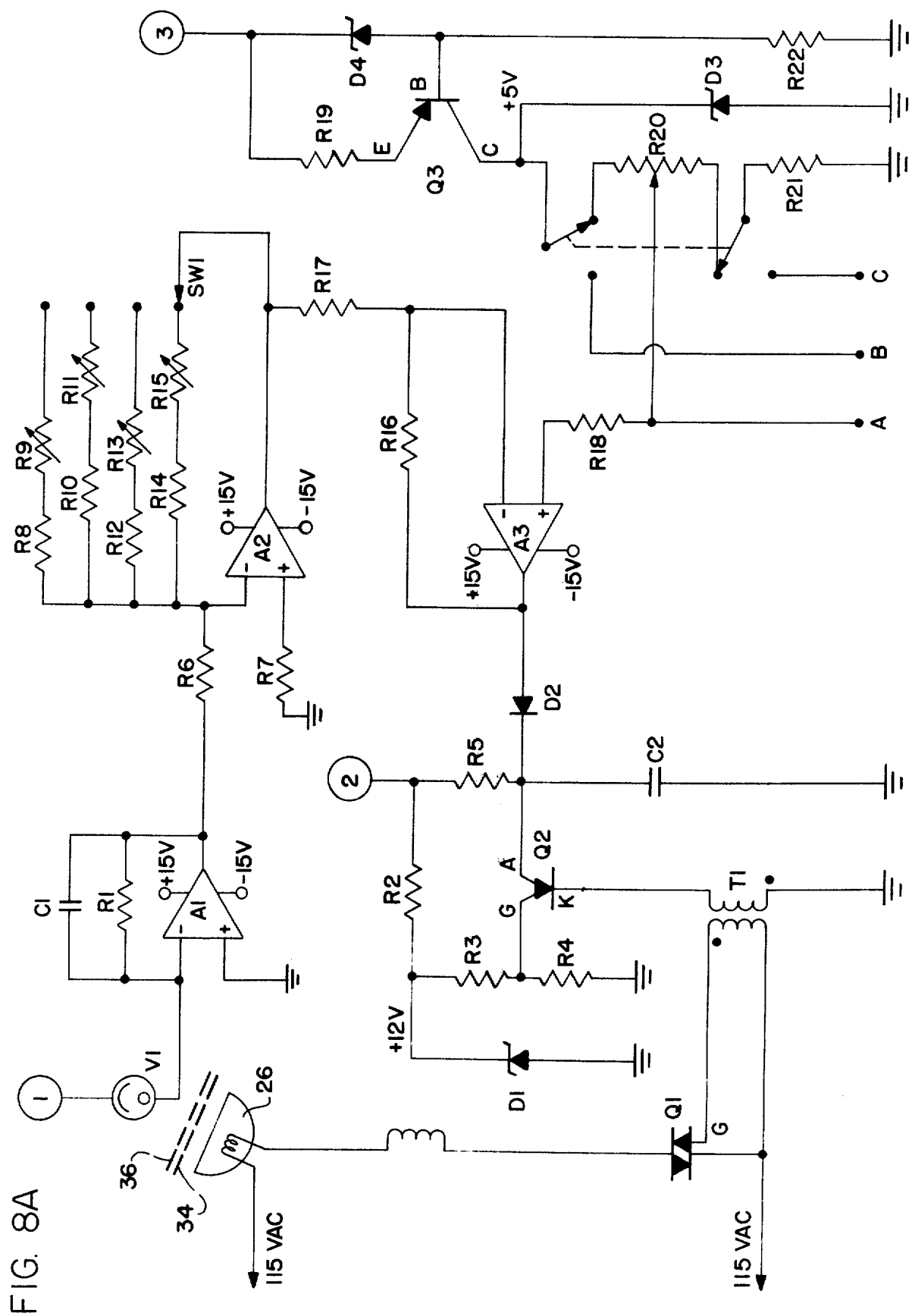
FIGS. 8A and 8B are schematical representations of circuitry which can be used in conjunction with the foregoing embodiments of the invention.
Figure 8B:
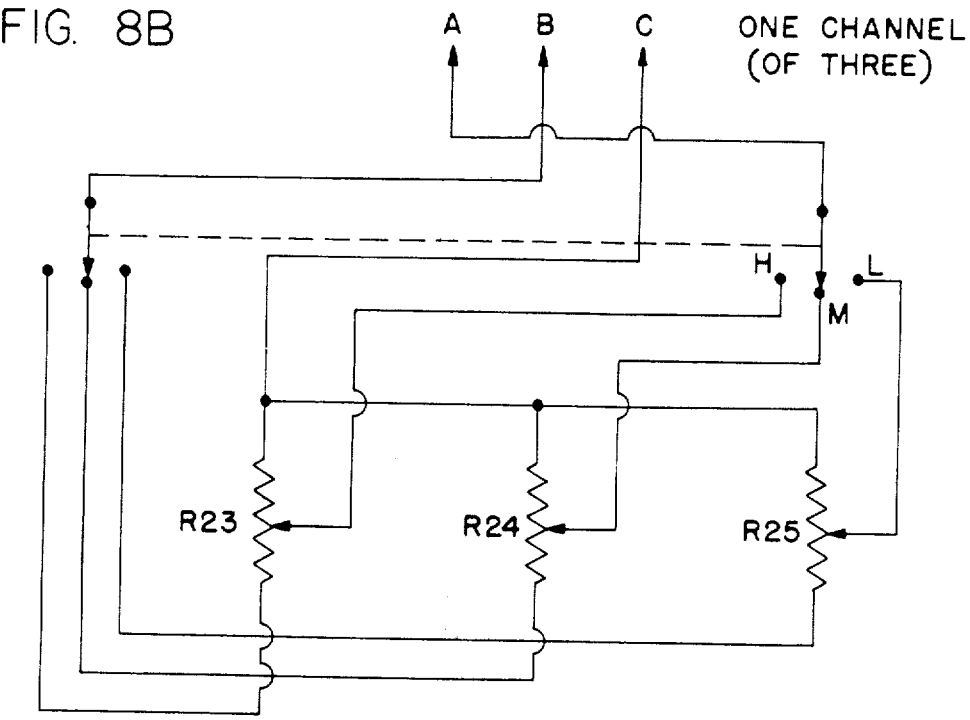

Looking now to the details of FIGS. 8A and 8B, which schematically set forth the details of the circuitry diagrammatically disclosed at 66, 77, and 82 in FIG. 2, it will be noted that the circuit broadly provides a controlled source of current to each of the lamps, with the lamp 26 being exemplary of the lamps 26–30 of FIG. 1. The lamp is schematically illustrated as being outwardly spaced from photocell V1, with a sample of light impinging thereon in the before described manner.

Those skilled in the art and having read the foregoing portion of this disclosure will be able to assign the proper values and components to the schematical illustration shown in the drawings. One set of circuit values which has proven acceptable for proper operation of the invention are as follows:

CIRCUIT VALUES, FIGURES 8A AND 8B

| | | | |
|---|---|---|---|
| V1 | 1P39 | R1 | 1 meg. |
| A1 | "u"L725 | R2 | 50K |
| | | R3 | 1.8K |
| A2 | "u"L741 | R4 | 2.7K |
| A3 | "u"L741 | R5 | 1.2 meg. |
| | | R6 | 10K |
| C1 | 0.1"u"f | R7 | 5K |
| C2 | 0.2"u"f | R8 | 40K |
| | | R9 | 100K |
| D1 | 1N4742 | R10 | 20K |
| D2 | | R11 | 50K |
| | | R12 | 10K |
| D3 | 1N4733 | R13 | 20K |
| D4 | 1N4733 | R14 | 5K |
| | | R15 | 10K |
| Q1 | 2N5573 | R16 | 100K |
| Q2 | 2N6027 | R17 | 10K |
| | | R18 | 9K |
| Q3 | 2N5226 | R19 | 150 |
| | | R20 | 1000 |
| | | R21 | 60 |
| | | R22 | 2.2K |

VOLTAGE: 1 − +225 volts
2 − +225 volts
3 − + 15 volts

Figure 9:
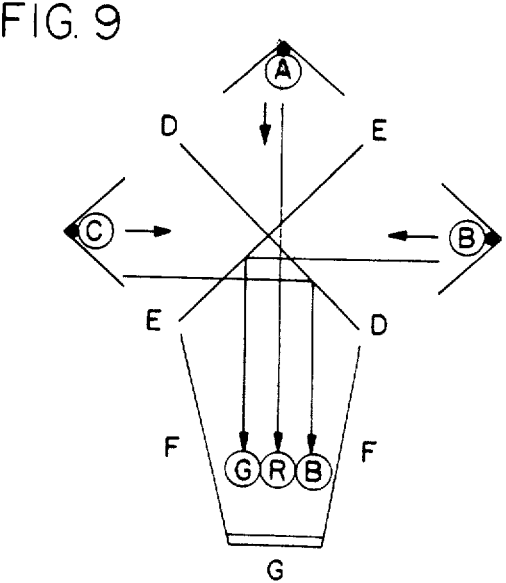
FIG. 9 is a diagrammatical representation of another embodiment of the invention.

Looking now to the details of FIG. 9, which diagrammatically represent a color head control system wherein several different arrangements and selections of dichroic transparent mirrors provide light from three differently orientated white light sources A, B, and C. The light is directed through sets of dichroic mirrors, DD and EE, and into light shaft FF where the light GRB (green, red, and blue), then shines through a diffusor G'.

The light at source A, B, C is white or unfiltered light, the green, blue, and red components of which must pass through one or more of the dichroic mirrors before it emerges from the diffusor, as will be specifically described hereinafter.

The dichroic mirrors DD, EE can be any combination of two mirrors selected from the following: a dichroic mirror that reflects blue light and transmits red and green light; a dichroic mirror that reflects green light and transmits red and blue light; and a dichroic mirror that reflects red light and transmits green and blue light.

Assuming that the dichroic mirror selected at D—D transmits red and green while reflecting blue, and further assuming that the dichroic mirror selected at E—E transmits red and blue while reflecting green, the following resultant light will be transmitted from the white or aggreate light sources A, B, C, and through the diffusor G':

light from source A impinges upon dichroic mirror E—E and has the green spectrum thereof reflected while the red and blue spectrum passes onto the mirror D—D, whereupon only the red spectrum is transmitted (the green having been previously reflected) while the blue light is reflected. Accordingly, only the red component of light from source A passes through the arrangement of mirrors and enters the light pipe F—F;

light from source B, upon encountering dichroic mirror D—D, has the blue component thereof reflected away while the red and green components are transmitted through the mirror and continues to travel until it encounters mirror E—E. The red component of the light is accordingly transmitted through the mirror E—E while the green component thereof is reflected into the light pipe at G and through the diffusor G';

light from source C first encounters dichroic mirror E—E whereupon the green component thereof is reflected away while the red and blue component is transmitted through the mirror, and continues to travel until it encounters dichroic mirror D—D which transmits the green color component but reflects the blue so that only blue light originating at source C is transmitted through the diffusor G'.

Accordingly, by selecting the proper combination of dichroic mirrors and arranging the mirrors in the illustrated manner of FIG. 9, the color components derivable from a white light source can be predetermined so as to provide a source of light at G' comprised of any predetermined number of different color combinations that may be desired.

Those skilled in the art will recognize that the reflected blue light from source B, for example, can again be reflected and caused to impinge upon dichroic mirror E—E, for example, which will transmit the light with the light being reflected in this manner until ultimately it will emerge through a suitable mirror so that it can be utilized at G'.

Looking now to the operation of the circuitry set forth in FIGS. 8A and 8B, in conjunction with some of the remaining circuits, those skilled in the art will readily comprehend the following operational details thereof.

Photo Diode V1 is any suitable device which will produce a current proportional to incident light radiation. This signal is applied to the negative, or inverting input, of the Operational Amplifier A1. Amplifier A1 is connected in such a manner as to produce a negative voltage which is proportional to the photo current of V1. This voltage is applied through Resistor R6 to the negative input of Operational Amplifier A2. This amplifier, in conjunction with Switch SW1 and Resistors R8 through R15, provides for range switching with a ratio of 2 to 1 preferably being provided between adjacent ranges. The output voltage of A2 is applied to the negative input of Operational Amplifier A3, where it is compared to the reference voltage applied to the positive input of A3.

The reference voltage, which is applied to the positive input of A3, is derived from a voltage divider consisting of a potentiometer R20 and Resistor R21. This reference voltage is preferably adjustable between the limits of 6.25 to 100 percent of full scale. Zener Diode D3 produces a regulated voltage of approximately 5 volts over a wide range of operating conditions, and, since it is provided with a constant current, accordingly will supply a very stable reference voltage for the circuitry. This constant current is derived from a constant current regulator consisting of circuitry comprised of Transistor Q3, R19, D4, and R22.

Amplifier A3 therefore provides an output voltage which is proportional to the difference between the signal derived from the light falling upon V1, properly scaled by A2 and SW1, and the signal derived from the reference setting of R20. This difference voltage is amplified by A3 in proportion to the ratio between R16 and R17 (10 times). The lamp which shines through the various before mentioned filtering media and upon V1 is controlled by a solid state device Q1, known to those skilled in the art as a Triac.

The Triac has the capability of conducting throughout the remainder of the alternating current cycle at any time a positive or negative signal is applied to Terminal G. A circuit which produces these triggering pulses for Q1 is made up of a programmable unijunction transistor Q2 and transformer T1 in conjunction with the adjacent components. These pulses are timed to arrive at the appropriate part of the alternating current cycle so that the average power applied to the lamp will produce the desired light intensity falling upon V1.

The arrangement of the amplifiers A1, A2, and A3 is such that a reduction in light intensity will result in a higher voltage on C2, thereby triggering Q1 earlier in the cycle, and consequently providing a higher average power and balancing the circuit. Inasmuch as increasing the reference voltage from R20 (because it is applied to a positive amplifier input) will have the same effect as a reduction in the intensity of the light, this will also cause a higher average power level to be applied to the lamp. Conversely, since decreasing the reference voltage from R20 will have the same effect on the circuitry as an increase in light, this action will cause a lower average power level to be applied to the lamp. Thus, in effect, R20 becomes a brightness control, and can be related to control 77 of FIG. 2.

The switching arrangement at R20 and R21 eliminates the action of the brightness control R20 and enables the preset variable resistors R23-R25 to be rapidly interposed in the so that the preset condition represented by the circuitry of FIG. 8B can be realized at any time by merely switching the gang switch represented therein.

The switching arrangement in FIG. 8B enables a soft, medimum, or low contrast (indicated by SML) to be selected for each of the three channels so that variable contrast black and white material may be advantageously exposed by the composite light source, while at the same time the actinic value remains constant.

I claim:

1. Method of making color prints from a color negative spaced between a lamphouse and an image producing lens wherein the lamphouse is optically coupled with an enlarger to provide a single source of component light comprised of a plurality of different primary colors, comprising the steps of:

supplying said component light with an electrically powered illuminating apparatus for each primary color;

selecting a color intensity for each of the different primary colors;

establishing an electrical reference signal for each primary color, with the magnitude of each said electrical reference signal being representative of the color intensity selected for a primary color;

connecting the last said illuminating apparatus in series with a control means, so that electrical current flowing through the illuminating apparatus can be controlled;

controlling the color intensity of a color component of the component light in proportion to the magnitude of said electrical reference signal;

transmitting a sample of the component light through a filter means which establishes a light source for each different primary color;

measuring the intensity of the transmitted light for each different primary color;

providing an electrical intensity signal which is proportional to said measured intensity;

amplifying said electrical intensity signal, conditioning said amplified signal, and connecting the amplified signal to cause the average power applied to the illuminating apparatus to produce the desired light intensity measured for each different primary color;

electronically comparing the electrical intensity signal to said electrical reference signal;

changing said electrical reference signal to a value to cause said electrical intensity signal to attain the selected color intensity;

using a Triac as the control means, and connecting said amplified signal to said Triac by a programmable unijunction transistor by interposing a transformer between the transistor and the Triac and arranging the circuitry whereby a reduction in light intensity will result in triggering the Triac earlier in its cycle to thereby provide a higher power to the illuminating means.

2. The method of claim 1 and further including the teps of:

carrying out the steps of transmitting said sample of light by interposing a beam splitter in the path of the projected light stream and diverting the sample to a light sensor; and arranging the distance between said lens and light sensor to be equal to the distance between said lens and the print to be made.

3. The method of claim 1 and further including the teps of:

arranging three component light sources in the lamphouse with each of the light sources being directed towards a dichroic mirror arrangement wherein:

arranging one dichroic mirror of the arrangement to pass red and blue light from one light source to a second dichroic mirror which passes red and green light so that a red light component passes through the dichroic mirror arrangement;

selecting said one dichroic mirror whereby it reflects green light; and selecting said second dichroic mirror so that it reflects blue light;

arranging said dichroic mirrors whereby the red and blue components of a second light source passes through one mirror and the green component thereof is reflected;

passing the third light source through said arrangement of said dichroic mirrors so that red and blue light passes through the first mirror and blue light is reflected by said second mirror;

whereby said red, blue, and green light jointly provides the single source of composite light.

4. The method of claim 1 and further including the steps of:

arranging three spaced composite light sources in spaced relation respective to a pair of dichroic mirrors;

selecting said pair of mirrors from a group of dichroic mirrors having the following light passing characteristics:

1. dichroic mirror transmits blue and red while reflects green;
2. dichroic mirror transmits blue and green while reflects red;
3. dichroic mirror transmits green and red while reflects blue;

arranging said pair of mirrors so that a first light component passing therethrough to provide a first primary color; and, a second light component passes through one mirror and is reflected by the remaining mirror to provide a second primary color; and, a third light component passes through one mirror and is reflected by the remaining mirror to provide a third primary color.

5. The method of claim 4 and further including the step of selecting said pair of mirrors so that one said mirror transmits blue and red while reflects green; and another said mirror transmits blue and green while reflects red.

6. Method of making color prints from a color negative spaced between a lamphouse and an image producing lens by optically coupling the lamphouse with an enlarger to provide a single source of component light comprised of a plurality of different primary colors, comprising the steps of:

1. illuminating a negative to be printed by connecting the illuminating apparatus of the lamphouse to a suitable power source to establish sufficient illumination for each primary color;
2. selecting a color intensity for each of the different primary colors;
3. establishing a reference electrical signal for each primary color, with the magnitude of each said reference signal being representative of the color intensity selected for a primary color;
4. controlling the power source connected to the illuminating apparatus so that the color intensity of a color component of the component light is proportional to the magnitude of said reference signal;
5. interposing a beam splitter in the projected light stream and transmitting a sample of the component light through a filter means which establishes a light source for each different primary color;
6. measuring the intensity of the transmitted light for each different primary color by diverting the sample of filtered component light onto a light sensor;
7. establishing an intensity electrical signal which is proportional to said measured intensity;

8. electronically comparing the intensity electrical signal to said reference electrical signal;

9. electronically changing the reference signal so that the ratio between said reference signal and the intensity signal is of a value which provides the illumination required to provide the selected color intensity of step (2).

7. The method of claim 6 and further including the following additional steps:

controlling the magnitude of the power source by connecting the intensity signal to circuitry which causes increasing current to flow to the illuminating apparatus whenever a decrease in light intensity is received by the light sensor, and which causes decreasing current to flow to the illuminating apparatus whenever an increase in light intensity is received by the light sensor.

8. The method of claim 6 wherein the step of controlling the power source is carried out by:

amplifying said intensity signal; connecting the amplified signal to a Triac by circuitry which includes a programable transistor; and, arranging the last said circuitry so that an increase in the intensity electrical signal will result in triggering the Triac later in its cycle to thereby provide a decreased power to the illuminating means.

9. In a photographic printer apparatus for color printing having a holder for an image bearing support, means for supporting multiple sensitized photographic material in spaced relation to said holder, illuminating means forming a composite light stream containing a plurality of light components of different wave lengths for illuminating said support, an objective lens system gathering light from said holder and focusing it to form a printing beam which is transmitted to the means for supporting the sensitized material to form a projected image on any sensitized material supported thereon, a light sensor means, means extracting a representative sample of said composite light stream, and a filter means for separating said sample of composite light into different ones of its light components; the improvement comprising:

said light sensor means having circuit means which provides an intensity signal which is proportional to the intensity of one of the different ones of the light components of said sample;

controller means connected to provide a variable source of power for said illuminating means; means including circuitry for providing a reference signal to said controller means thereby enabling the power range for said illuminating means to be selected;

circuitry including error detecting means for detecting and correcting the ratio between said intensity signal and said reference signals so that the magnitude of the light intensity of the light component of the sample of light is maintained at constant value;

means by which a beam splitter is interposed between said lens and said means for supporting photographic material, with light from said beam splitter being directed to said light sensor means;

means by which the distance between said lens and said light sensor means is arranged to be equal to the distance between said lens and said means for supporting photographic paper;

means by which a Fresnel lens is interposed between said beam splitter and said light sensor means;

means by which a dichroic mirror arrangement is interposed between said Fresnel lens and said light sensor means;

means by which said dichroic mirrors are arranged respective to one another, to said Fresnel lens, and to said light sensor means whereby red light is directed into a first light sensor, green light is directed into a second light sensor, and blue light is directed onto a third light sensor.

10. Photographic printer apparatus for color printing having a holder for an image bearing support, means for supporting multiple sensitized photographic material in spaced relation to said holder; a color head having illuminating means forming a composite light stream containing a plurality of light components of different wave lengths for illuminating said support, an objective lens system gathering light from said holder and focusing it to form a printing beam which is transmitted to the means for supporting the sensitized material to form a projected image on any sensitized material supported thereon; in combination;

a tricolor additive system for said color head comprising a light sensor means, means including a beam splitter for extracting a representative sample of said composite light stream, means separating said sample of composite light into different ones of its light components; means by which said light sensor means is arranged to receive the separated light from said beam splitter, circuit means connected to said light sensor means for providing an intensity signal which is proportional to the intensity of one of the different ones of the light components of said sample;

controller means including circuitry connected to provide a variable source of power for operating said illuminating means; means including circuitry for providing a reference signal to said controller means, which selects a power for said illuminating means;

error detecting means for detecting and correcting the ratio between said intensity and said reference signals so that the magnitude of the light intensity of the light component of the sample of light is maintained at constant value.

11. The printer apparatus of claim 10 wherein said beam splitter is interposed between said lens and said means for supporting photographic material;

the distance between said lens and said light sensor means being equal to the distance between said lens and said means for supporting photographic paper;

a Fresnel lens interposed between said beam splitter and said light sensor means;

a dichroic mirror arrangement interposed between said Fresnel lens and said light sensor means;

means by which said dichroic mirrors are arranged respective to one another, to said Fresnel lens, and to said light sensor means whereby red light is directed into a first light sensor, green light is directed onto a second light sensor, and blue light is directed onto a third light sensor.

12. The printer apparatus of claim 10 wherein said light sensor is a photocell; and, said illuminating means includes a plurality of lamps each having a filter through which the light must pass so that each lamp provides a light source comprised essentially of a light component which is a primary color.

13. The printer apparatus of claim 12 wherein said photocell and said means for supporting are spaced equal distances from said lens system.

14. The printer apparatus of claim 12 wherein said illuminating means for illuminating said support comprises a first and a second dichroic mirror arranged perpendicular respective to one another, and a first, second, and third lamp arranged 90° to one another with each lamp arranged so that some of the light therefrom passes through one said mirror and some of the remaining light is reflected by the second mirror;

said mirrors having characteristics selected from two of the following three mirrors:
1. dichroic mirror transmits blue and red while reflects green;
2. dichroic mirror transmits blue and green while reflects red;
3. dichroic mirror transmits green and red while reflects blue.

15. The printer apparatus of claim 14 wherein the first mirror is selected to transmit red and blue while reflecting green; and, the second mirror is selected to transmit red and green while reflecting blue.

16. The printer apparatus of claim 12 wherein a first and second dichroic mirror are arranged normally respective to one another so that light must contact both mirrors before impinging upon its corresponding light sensor, said mirrors being selected from a group of mirrors having the following characteristics:
1. dichroic mirror transmits blue and red while reflects green;
2. dichroic mirror transmits blue and green while reflects red;
3. dichroic mirror transmits green and red while reflects blue.

17. The printer apparatus of claim 10, wherein said color head includes a lamp house concentrically mounted in spaced relation within a housing, a downwardly opening skirt member which forms a chamber between said housing and the lamp house;

said illuminating means includes first radially spaced light inlet ports formed in said lamp house, a lamp for each port, means by which said lamp forms at least one component of the composite light stream, means mounting said lamp externally of the lamphouse and within the housing so that the light therefrom is directed through a port and into the lamphouse;

said beam splitter includes a second radially spaced light outlet ports formed in said lamp house in vertical spaced relationship respective to said first radially spaced light inlet ports, one said light sensor means for each port, there being at least one port for each component of the composite light stream; and means mounting said light sensor means externally of the lamphouse and within the housing so that a sample of the light therefrom is directed through the last said port and onto the light sensor means.

18. In a photographic printer apparatus for color printing having a holder for an image bearing support, means for supporting multiple sensitized photographic material in spaced relation to said holder; a color head having illuminating means forming a composite light stream containing a plurality of light components of different wave lengths for illuminating said support, an objective lens system gathering light from said holder and focusing it to form a printing beam which is transmitted to the means for supporting the sensitized material to form a projected image on any sensitized material supported thereon; the improvement comprising:

said color head having a lamp house concentrically mounted in spaced relation within a housing, a downwardly opening skirt member which forms a chamber between said housing and the lamp house;

first radially spaced light inlet ports formed in said lamp house, a lamp for each port, means by which said lamp forms at least one component of the composite light stream, means mounting said lamp externally of the lamphouse and within the housing so that the light therefrom is directed through a port and into the lamphouse;

second radially spaced light outlet ports formed in said lamp house in vertical spaced relationship respective to said first radially spaced light inlet ports, a light sensor means for each port, there being at least one port for each component of the composite light stream; means mounting said light sensor means externally of the lamphouse and within the housing so that a sample of the light therefrom is directed through the last said port and onto the light sensor;

circuit means connected to said light sensor means for providing an intensity signal which is proportional to the intensity of one of the different ones of the light components of said sample;

controller means including circuitry connected to provide a variable source of power for operating said illuminating means; means including circuitry for providing a reference signal to said controller means, which selects a power for said illuminating means; and, error detecting means for detecting and correcting the ratio between said intensity and said reference signals so that the magnitude of the light intensity of the light component of the sample of light is maintained at constant value.

* * * * *